United States Patent
Janakiraman et al.

(10) Patent No.: US 10,760,815 B2
(45) Date of Patent: Sep. 1, 2020

(54) BUILDING SYSTEM COMMISSIONING USING MIXED REALITY

(71) Applicant: Honeywell International Inc., Morris Plains, NJ (US)

(72) Inventors: Kirupakar Janakiraman, Madurai (IN); Rajesh Kulandaivel Sankarapandian, Madurai (IN); Jayaprakash Meruva, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/847,313

(22) Filed: Dec. 19, 2017

(65) Prior Publication Data

US 2019/0186779 A1   Jun. 20, 2019

(51) Int. Cl.
| | |
|---|---|
| F24F 11/89 | (2018.01) |
| G06F 3/01 | (2006.01) |
| G06T 19/00 | (2011.01) |
| G06K 9/00 | (2006.01) |
| G05B 15/02 | (2006.01) |
| H04L 12/28 | (2006.01) |

(52) U.S. Cl.
CPC .............. *F24F 11/89* (2018.01); *G05B 15/02* (2013.01); *G06F 3/011* (2013.01); *G06K 9/00671* (2013.01); *G06T 19/006* (2013.01); *H04L 12/2807* (2013.01)

(58) Field of Classification Search
CPC .... F24F 11/89; H04L 12/2807; G06T 19/006; G06K 9/00671
See application file for complete search history.

(56) References Cited

U.S. PATENT DOCUMENTS

| | | | |
|---|---|---|---|
| 7,567,844 B2 * | 7/2009 | Thomas ................. | G05B 15/02 700/19 |
| 2003/0177205 A1 | 9/2003 | Liang et al. | |
| 2004/0250236 A1 * | 12/2004 | O'Malley ............... | G06F 17/50 717/104 |
| 2006/0044307 A1 * | 3/2006 | Song ...................... | G06Q 10/06 345/419 |

(Continued)

FOREIGN PATENT DOCUMENTS

WO     20170192752 A1    11/2017

OTHER PUBLICATIONS

Lee, et al., "The Virtual-Augmented-Reality Environment for Building Commission: Case Study", Proceedings of the Fifth International Conferene for Enhanced Builidng Operations, Pittsburgh, Pennsylvania, Oct. 2005, 6 pages.

(Continued)

*Primary Examiner* — Samantha (Yuehan) Wang
(74) *Attorney, Agent, or Firm* — Seager, Tufte & Wickhem, LLP (57) ABSTRACT

Methods, devices, and systems for building system commissioning using mixed reality are described herein. One system includes a computing device comprising computer readable instructions stored thereon that are executable by a processor to retrieve configuration data for a physical controller from a remote distributed database in response to receiving a query, display the configuration data for the physical controller in a mixed reality display on a mixed reality device, and install the configuration data on the physical controller.

18 Claims, 6 Drawing Sheets

(56) References Cited

U.S. PATENT DOCUMENTS

| | | | | |
|---|---|---|---|---|
| 2011/0115816 | A1* | 5/2011 | Brackney | G06Q 10/06 345/629 |
| 2013/0031202 | A1 | 1/2013 | Mick et al. | |
| 2013/0069985 | A1* | 3/2013 | Wong | G02B 27/017 345/633 |
| 2013/0212453 | A1 | 8/2013 | Gudai et al. | |
| 2015/0062164 | A1* | 3/2015 | Kobayashi | G06T 11/60 345/633 |
| 2015/0120000 | A1* | 4/2015 | Coffey | H04L 12/2803 700/13 |
| 2015/0310664 | A1* | 10/2015 | Boussard | G06T 19/006 345/633 |
| 2016/0019212 | A1* | 1/2016 | Soldani | G06F 16/434 345/633 |
| 2016/0095188 | A1 | 3/2016 | Verberkt et al. | |
| 2016/0313902 | A1* | 10/2016 | Hill | G06F 3/04847 |
| 2017/0005344 | A1 | 2/2017 | Nadumane et al. | |
| 2017/0053441 | A1* | 2/2017 | Nadumane | H04L 67/06 |
| 2017/0091607 | A1 | 3/2017 | Emeis et al. | |
| 2017/0021339 | A1 | 7/2017 | Ramachandran et al. | |
| 2018/0012173 | A1* | 1/2018 | Leen | G05B 15/02 |
| 2018/0157321 | A1* | 6/2018 | Liu | G06F 3/013 |

OTHER PUBLICATIONS

Akin, et al., "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.

Lee, et al., "The Development of an Augmented Reality-Based Data Visualization System for Commissioning of Air Handling Units", 7th International Conference on Construction Applications of Virtual Reality, Oct. 2007, 10 pages.

Lee, et al., "The Development of an Augmented Reality-Based User Interface to Support Maintenance Fieldwork", Embodying Virtual Architecture: The Third International Conference of the Arab Society for Computer Aided Architectural Design (ASCAAD 2007), Nov. 2007, 8 pages.

Hakkarainen, et al., "Mobile Augmented Reality for Building and Construction", International AR Standards Workshop, Oct. 2010, 3 pages.

PCT/US2018/065970 Search Report and Written Opinion, pp. 13, dated Mar. 22, 2019.

* cited by examiner

BUILDING SYSTEM COMMISSIONING USING MIXED REALITY

TECHNICAL FIELD

The present disclosure relates to methods, devices, and systems for building system commissioning using mixed reality.

BACKGROUND

One or more building systems can be installed in a building to manage aspects of the building. Building systems can include, for example, heating, ventilation, and air conditioning (HVAC) systems, access control systems, security systems, lighting systems, and fire systems, among others. A building system can refer a single building system (e.g., an HVAC system) and/or a system that manages a number of building systems (e.g., a building management system (BMS)).

Each building system typically includes a plurality of devices. When a building system is commissioned (e.g., at installation), specific devices may need a specific type of installation and commissioning based on an ontology model. The information of the ontology may be present in the form of documents and diagrams that an engineer may have to carry along with him in the field. This may be a time consuming job to understand the mapping of the ontology that needs to be done by referring to these documents and diagrams on a computing device or physical papers while performing the installation and commissioning of modules and controllers.

A certain level of expertise and experience may be required of the engineers in commissioning the devices. Additionally, there is no event driven checklist or run-time validation available towards the commissioning activities or the deployment and configuration of the devices. Furthermore, issues occurring during the commissioning process may result in unrecoverable damages and productivity issues.

DETAILED DESCRIPTION

Devices, methods, and systems for building system commissioning using mixed reality are described herein. For example, an embodiment includes a memory, and a processor configured to execute executable instructions stored in the memory to retrieve configuration data for a physical controller from a remote distributed database in response to receiving a query, display the configuration data for the physical controller in a mixed reality display on a mixed reality device, and install the configuration data on the physical controller.

In another example, a mixed reality device, in accordance with the present disclosure can include instructions to: download project instructions for a project from a remote distributed database in response to a query, generate a project checklist for the project based on the project instructions and information detected from a device associated with the project, display the project instructions and the project checklist for the project in a mixed reality display on the mixed reality device, and receive selectable inputs corresponding to the project checklist.

Devices, methods, and systems for building system commissioning using mixed reality described herein can utilize a remote distributed database to provide two way data communication between the distributed database and a mixed reality device. In some examples, the mixed reality devices can update an application on the mixed reality device via the two way data communication. In some examples, the mixed reality device can update data relating to a project (e.g., construction project, etc.) via the application on the mixed reality device. In some examples, the data relating to the project can be synchronized with project data within the distributed database.

In some examples, the mixed reality device can download data associated with the project. In some examples, the data associated with the project can include configuration data. In some examples, the configuration data configures a number of settings for functionality of the physical controller upon being installed on the physical controller. For example, the mixed reality device can download binary files to configure a physical controller by uploading the binary files to the physical controller. In this example, the mixed reality device can download the configuration data from the distributed database and install the configuration data on the physical controller.

In some examples, the mixed reality device can request configuration data based on information detected through spatial mapping. For example, a mixed reality device can detect a device, such as a physical controller, associated with the project. In this example, the mixed reality device can request the configuration data for the physical controller upon detecting the device (e.g., the physical controller).

In some examples, the mixed reality device can request configuration data based on information scanned from a physical controller. For example, a user can scan a code located on the physical controller or box of the physical controller. In this example, the mixed reality device can request the configuration data for the physical controller based on the scan of the code.

In some examples, the mixed reality device can display a project checklist based on project information stored at the distributed database utilizing a mixed reality display. In some examples, the project checklist can include a number of selectable inputs. In some examples, the number of selectable inputs can correspond to a number of project tasks that a user may complete prior to completing the project. For example, the number of project tasks can include a wiring checkout, a sensor calibration, and/or a sequence validation of test results, among other project tasks that are associated with the project.

Devices, methods, and systems for building system commissioning using mixed reality described herein can be utilized to enable a user to perform commissioning activities for the project utilizing a mixed reality display. For example, a mixed reality device can be utilized to download project information and synchronize data associated with the status of physical controllers and/or project checklists with the distributed database. The mixed reality device can display the project information in a mixed reality display.

Building commissioning using mixed reality can provide a hands free method of building commissioning. Additionally, displaying, by the mixed reality device, the project instructions and the project checklist for the project in a mixed reality display can reduce building commissioning errors by validating each step of the building commissioning process and provide real time instructions to the user.

In the following detailed description, reference is made to the accompanying drawings that form a part hereof. The drawings show, by way of illustration, how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of process variables" can refer to one or more process variables.

Figure 1A:
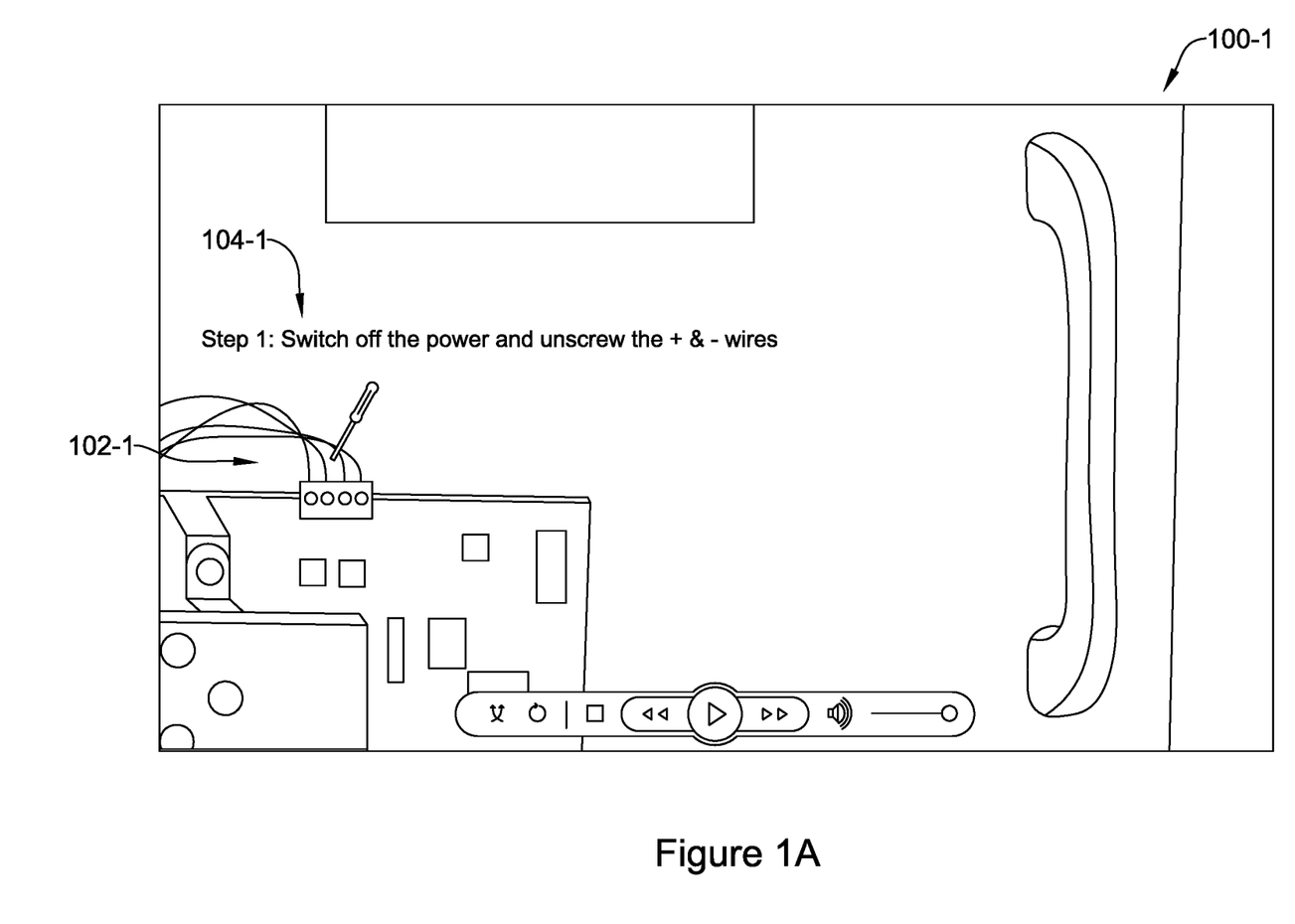
FIGS. 1A and 1B illustrate an example of a mixed reality display, in accordance with one or more embodiments of the present disclosure.
Figure 1B:
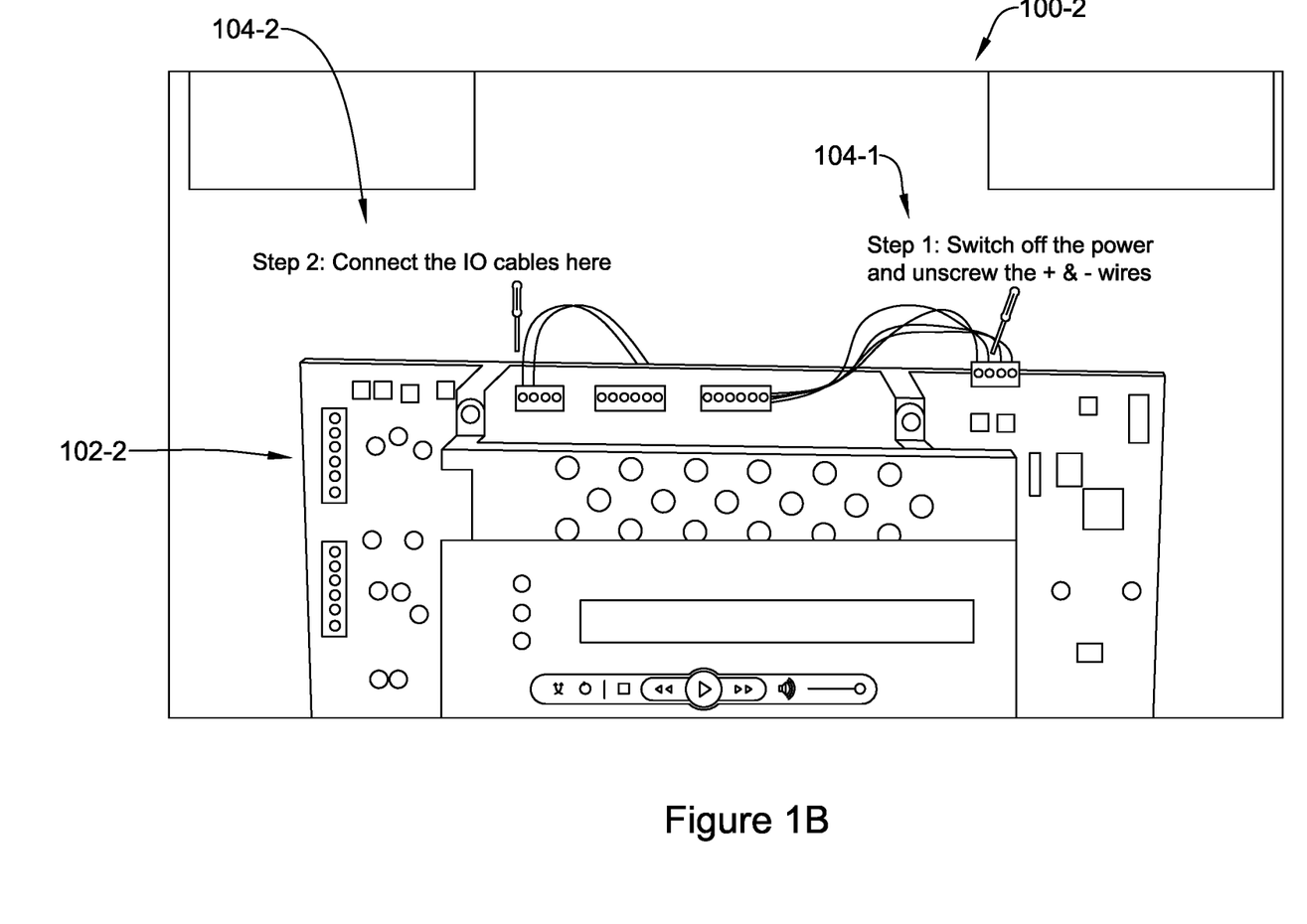

FIGS. 1A and 1B illustrate an example of a mixed reality display 100-1, 100-2, in accordance with one or more embodiments of the present disclosure. The mixed reality display 100-1, 100-2 can be displayed on a mixed reality device. The mixed reality device can be, for example, a head mounted display, a handheld display, or a spatial display, among other types of mixed realty devices. The mixed reality device can include a computing device, for example, a commodity server, or a data center that comprises a plurality of servers, among other types of mixed reality devices or embedded system.

Mixed reality can include the merging of the real world and the virtual world to produce a new environment or visualization where physical and digital objects can co-exist and interact in real time. Mixed reality can include a mix of reality and virtual reality, encompassing both augmented reality and augmented virtuality via immersive technology. Mixed reality may include an overlay or a mixed reality holographic object of synthetic content on real world content that is anchored to and interacts with the real world content. For example, the synthetic content and real world content may be able to react to each other in real time.

In some examples, mixed reality display 100-1, 100-2 can be displayed on the mixed reality device. In some examples, the mixed reality device can be utilized to retrieve data (e.g., schematics, configuration data, etc.) relating to a project and/or updating a status of the project, and/or displaying a status of the project. A project can include an installation of a heating, ventilation, and air conditioning (HVAC) system.

In some examples, the project can include data and information for completing the installation of the HVAC system. As described herein, the data and information can include schematics for installing devices associated with the HVAC system, instructions for installing physical controllers, and/or configuration data for the physical controllers.

As an example, the mixed reality device may include a transparent display through which a user may view a destination physical environment, such as a building or a device. The mixed reality device may also capture physical environment data from the destination physical environment. The destination physical environment may include one or more physical objects. Using such physical environment data, a 3-dimensional (3D) transformer may create a mixed reality model of the destination physical environment including the physical objects having associated physical object properties.

The 3D transformer may place a mixed reality hologram using a spatial anchor. For example, the spatial anchor may include a coordinate system that adjusts as needed, relative to other spatial anchors or a frame of reference to keep an anchored mixed reality hologram in place. The spatial anchor may include a device or room within the building. The mixed reality hologram can include a specific physical controller, project instructions, a project checklist, configuration data, among other data relating to a project.

In one example, a user may build a mixed reality model and stream it to another location for a detailed investigation. The user may receive, from a remote distributed database, data relating to the project. For example, the mixed reality device can receive, from the remote distributed database, configuration data for a physical controller and/or project instructions for the project. The configuration data and the project instructions can be customized for a particular device. Additionally, the mixed reality model may be archived for a future investigation and analytics may correlate such case data for a future re-usable solution.

In one example, as illustrated in FIGS. 1A and 1B, mixed reality display 100-1, 100-2 may include overlay 104-1, 104-2 with an object created based on building commissioning data, which may be sensor data, diagnostic procedures, or the like. Overlay 104-1, 104-2 may be configured for concurrent display on mixed reality display 100-1, 100-2 of the mixed reality device with a real time image of a physical controller 102-1, 102-2. In one example, the overlay 1041, 104-2 may include project instructions for a project configured for concurrent display with a real time image of the physical controller 102 being commissioned.

In one example, overlay 104-1, 104-2 can include a video control bar. The user may utilize the video control bar to display project instructions received from the remote distributed database. The project instructions can include step-by-step instructions to commission physical controller 102-1, 102-2. As described herein, the user can control the received configuration data using a gesture, a gaze, a voice command, or a combination thereof.

As described herein, mixed reality display 100-1, 100-2 can be utilized by a user of the mixed reality device to view project status information, perform a number of tests, update a checklist corresponding to the project, and/or retrieve/install configuration data. Thus, a user may perform the installation and commissioning of modules and controllers without the use of papers and additional computing devices.

Figure 2:
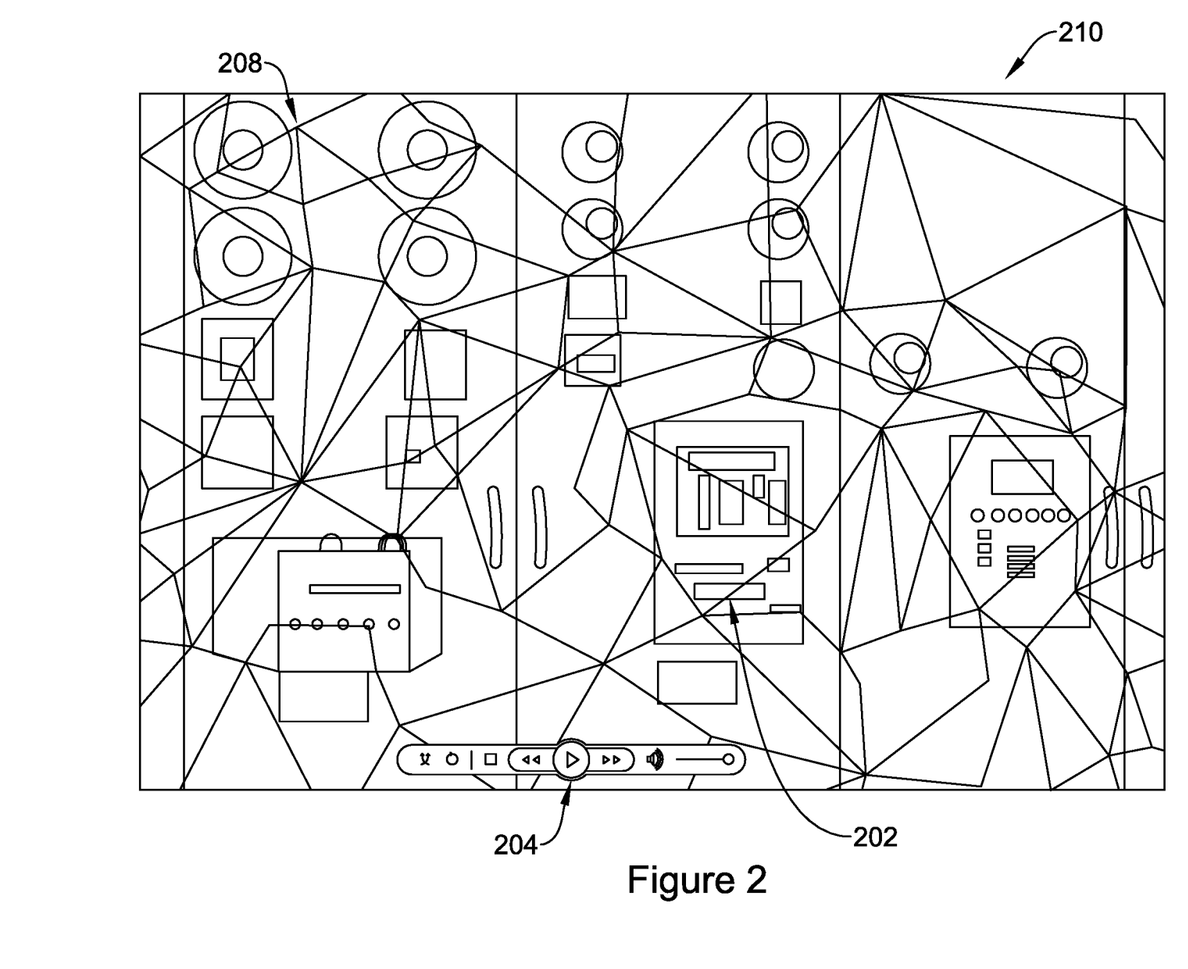
FIG. 2 illustrates an example of a mixed reality display, in accordance with one or more embodiments of the present disclosure.

FIG. 2 illustrates an example of a mixed reality display 210, in accordance with one or more embodiments of the present disclosure. As described herein, mixed reality display 210 can display configuration data for a physical controller on a mixed reality device. In one example, the mixed reality device can retrieve configuration data for the physical controller from a remote distributed database in response to receiving a query from a user. For example, the mixed reality device can receive configuration data in response to a gesture, a gaze, a voice command, or a combination thereof. In another example, the mixed reality device can receive configuration data in response to scanning a code on the physical controller. In some examples, the configuration data for the physical controller can include installation instructions and checkout instructions for the physical controller.

The mixed reality device may include various systems and sensors. For example, the mixed reality device may include an eye-tracking system that utilizes at least one inward facing sensor. The inward facing sensor may be an image sensor that is configured to acquire image data in the form of eye-tracking information from the user's eye. The eye-tracking system may use this information to track the position and/or movement of the user's eyes. The eye-tracking system may then determine where and/or what real-world or virtual object the user is gazing. The inward facing sensor may allow a user to move a curser to select a mixed reality hologram (e.g., a specific controller). For example, the user may turn their head and the curser will follow allowing the user to have a perceptual view of the physical controller or device while diagnosing or troubleshooting the physical controller.

The mixed reality device may also include an optical sensor that utilizes at least one outward facing sensor. The outward facing sensor may detect movements within its field of view, such as gesture based inputs or other movements performed by the user. Additionally, the outward facing sensor may detect real-world objects within the building, such as the physical controller.

In some examples, the user may use gestures, which may be detected by the outward facing sensor, to open applications, select and size items, and drag and drop holograms in the perceptual environment. The holograms may include information related to the physical controller. In some examples, the mixed reality device can be coupled to markers mounted on the hands of the user to detect gestures.

The outward facing sensor may identify the position of a physical controller or device relative to the user as the user changes position. In one example, the outward facing sensor can capture images of the physical environment in which the user is situated. The images can be part of physical environment data that can be received by the mixed reality device. As the user moves throughout the site the outward sensor can capture images of the physical environment.

As illustrated in FIG. 2, mixed reality display 210 may display a mesh cache 208 for the physical environment around the subject and the system may dynamically construct a real world model 202 within the spatial coordinate system along with a user camera point.

As illustrated in FIG. 2, mixed reality display 210 can include overlay 204. Overlay 204, for example, can include a video control bar. In one example, the user may utilize the video control bar to display project instructions downloaded from a remote distributed database on the mixed reality display. In another example, the user may utilize the video control bar to display a project checklist for the project based on the project instructions and information detected from the device associated with the project.

In one example, an activity report and/or a task completion report may be generated as the user moves throughout the site based on the images captured. The report may notify the user of a status of a device or physical controller. For example, the report may notify the user that a thermostat has been commissioned or is in need of commissioning. Additionally, the user may receive these context based notifications in real time as they move throughout the site.

The mixed reality device may include one or more microphones. In some examples, the microphones may receive audio input from a user and/or audio input from a physical environment around the user. In some examples audio input, such as voice input from the user, may be used to navigate, select, open, command, and control the applications. In some examples, the user may speak directly to the natural language processor (NLP) of the mixed reality device to receive information relating to completing a task. For example, the NLP may provide instructions relating to the commissioning and/or troubleshooting of an HVAC system and devices to the user. The more information provided to the NLP, the more information the user may receive.

In one example, receiving the query of the project can include a message received from a distributed database that a user of the mixed reality device is assigned a particular project. In some examples, the project can include an installation or test of the physical controller. In some examples, the notification can include a description of the project and a location of the physical controller.

In one example, the mixed reality device may detect sounds relating to the real physical object within the physical environment surrounding the user and/or the mixed reality holograms. While the mixed reality holograms can only appear visually where the user's gaze is pointing, the mixed reality device may detect sounds from all directions. For example, the user may detect sounds from above, below, behind, or to either side of the mixed reality device. The mixed reality device may detect a sound corresponding to a device that is outside of the current view. The user may perceive the sound to be emanating from a source in the mixed reality environment.

In one example, the mixed reality device may utilize audio haptics to support the sound of collisions based on a physical model and to increase the accuracy of sound localization near the user. For example, the mixed reality device may play a sound when the mixed reality device detects the user's hand within the mixed reality display or when the user selects a mixed reality hologram.

A system can utilize a network to allow a user with a mixed reality device to communicate with the distributed database. The mixed reality device may include Language Understanding Intelligent Service (LUIS). For example, language understanding models may be created for heterogeneous BMS commissioning use cases allowing the user to add conversational intelligence to a commissioning interface such that the user may provide voice commands. Hence, the user may use both of their hands while performing the installation, commissioning, or troubleshooting.

Mixed reality display 210 can display the general overview of status information relating to the project, such as an overview of progress for the project. For example, the mixed reality display can include a controller status. In some examples, the controller status can include status information relating to the installation and configuration of a number of physical controllers. For example, the controller status can include a total quantity of physical controllers relating to a project, a quantity of plant controllers, and/or quantity of unitary controllers.

Mixed reality display 210 can include a header. In some examples, the header can be utilized to select a particular category. For example, the header can be utilized to select between an installation check category, a wiring check category, a point check category, and a functional check category.

In some examples, the installation check category can include a status, inputs, installation diagrams, installation information, and/or selections related to an installation of a particular device. In some examples, the wiring check category can include status, inputs, wiring diagrams, wiring information, and/or selections related to wiring the particular device. In some examples, the point check category can include status, inputs, diagrams for point tests, point test information, and/or selections relating to performing a point test of the particular device. In some examples, the functional check category can include a status, inputs for performing the functional check, diagrams for performing the functional check, and/or selections relating to performing the functional check. As described herein, the mixed reality display can be utilized to tack and manage the number of categories.

In some examples, mixed reality display 210 can include a test indicator. In some examples, the test indicator can include a status of tests performed on physical controllers. As described herein, a user can input test results into the mixed reality device. The test results that are input into the mixed reality device can be utilized to determine when a test has passed, failed, or was unable to test. In some examples, the test indicator can be synchronized with the distributed database. For example, the test indicator can be updated based on data retrieved from the distributed database. In another example, the test results that are input into the mixed reality device can be uploaded to the distributed database. In some examples, mixed reality display 210 can be utilized to record a number of tests on the physical controller and synchronize results from the number of tests with the distributed database (e.g., remote distributed database, etc.).

In some examples, mixed reality display 210 can include a number of selectable functions. In some examples, the selectable functions can include, but are not limited to: an overview function, an install function, and/or a point shortcut function. In some examples, the selectable functions can be selected by a user to perform a number of functions described herein. For example, the selectable functions can include an install function to install configuration data on to a physical controller. In some examples, the configuration data can be retrieved from the distributed database by the mixed reality device. In some examples, the retrieved configuration data can be utilized to configure the physical controller.

In some examples the user can access data relating to the project via the mixed reality device and update the distributed database with a completed task relating to the project by synchronizing the mixed reality device with the distributed database via the network.

In some examples, a status indicator can be updated upon completion of the installation of the configuration data on the physical controller. For example, the status indicator can include a graphical representation that indicates a percentage of completion for a selected project or category. In some examples, the mixed reality device can receive data associated with a status of the physical controller after the configuration data is installed on the physical controller.

The status indicator can be updated upon completion of the project checklist. For example, the status indicator can be updated to reflect a greater percentage of completion when a project is complete and/or when a portion of the project checklist has been completed. As described herein, the mixed reality device utilized for the mixed reality display can retrieve data from the distributed database. In some examples, the retrieved data can be utilized to update the status indicator.

Figure 3:
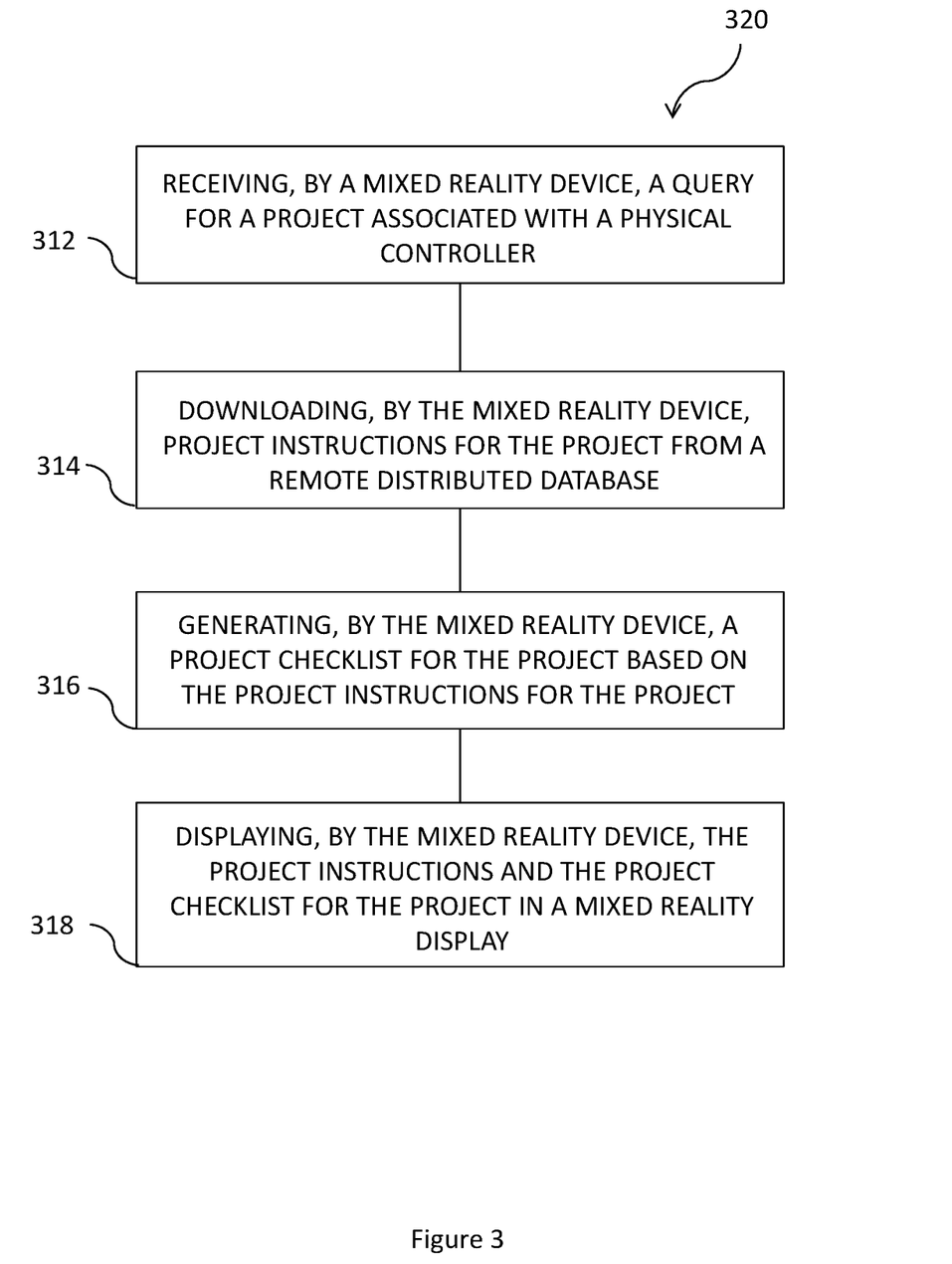
FIG. 3 is an example of a method for building system commissioning using mixed reality, in accordance with one or more embodiments of the present disclosure.

FIG. 3 is an example of a method 320 for building system commissioning using mixed reality according to one or more embodiments of the present disclosure. In some examples, the method 320 can be executed by a computing device. The method 320 can be executed by a mixed reality device, for example, a head mounted display, a handheld display, a spatial display, among other types of mixed realty devices.

At block 312, the method 320 can include receiving, by a mixed reality device, a query for a project associated with a physical controller. As described herein, receiving the query of the project can include a gesture, a gaze, a voice command, or a combination thereof. In some examples, mixed reality holograms displayed in a mixed reality display on the mixed reality device may be responsive to a user and/or the real world. The mixed reality device can include various systems and sensors to detect a query for project data from a remote distributed database.

At block 314, the method 320 can include downloading, by the mixed reality device, project instructions for the project from a remote distributed database, wherein the project instructions include configuration data for the physical controller. As described herein, data relating to the project can be downloaded by the mixed reality device. In some examples, the data relating to the project can include project instructions (e.g., wiring diagrams, location of installation, etc.). In some examples, the data relating to the project can include configuration data that can be utilized for configuring the physical controller. For example, the configuration data can include binary configuration data that can be installed on the physical controller via the mixed reality device.

At block 316, the method 320 can include generating, by the mixed reality device, a project checklist for the project based on the project instructions for the project, wherein the project checklist includes instructions to upload the configuration data to the physical controller. In some examples, the project checklist can include tasks to complete for proper installation and testing of the physical controller. In some examples, the project checklist can include an option for a project check out (e.g., tasks to complete before indicating the project is complete). In some examples, the project checklist can include a number of inputs for indicating that a particular task has been complete. In some examples, the project checklist can also include a number of inputs for testing the physical controller as described herein.

At block 318, the method 320 can include displaying, by the mixed reality device, the project instructions and the project checklist for the project in a mixed reality display. As described herein, the mixed reality display can include an overlay configured for concurrent display on the mixed reality display of the mixed reality device with a real time image of the physical controller. The overlay can include a mixed reality hologram of the project instructions and the project checklist.

In some examples the method 320 can include updating, by the mixed reality device, the project checklist to include information relating to completed tasks associated with the project, wherein the completed tasks include uploading the configuration data to the physical controller. In some examples, updating the project checklist can include receiving inputs, at the mixed reality device, to indicate test results and/or completion of particular tasks associated with the project.

In some examples, the method 320 can include synchronizing, at the mixed reality device, the project checklist with the remote distributed database. As described herein, the mixed reality device can synchronize updated data with the remote distributed database. For example, the project checklist can be completed and tests can be performed to confirm correct configuration of the physical controller. In this example, the updated data can be synchronized with the remote distributed database such that progress of the project can be tracked.

In some examples, the method 320 can include displaying, in a mixed reality display of the mixed reality device, the generated project checklist. As described herein, the project checklist can include a plurality of steps or actions to be performed prior to completing the project. In some examples, the project checklist can be displayed on the user interface of the mixed reality device such that a user can input selections when the user has completed a particular step or action of the project checklist. For example, the method 320 can include receiving inputs, by the mixed reality display of the mixed reality device, corresponding to the project checklist upon completion of tasks associated with the project.

In some examples, the method 320 can include calibrating the physical controller by uploading the configuration data to the physical controller. As described herein, the mixed reality device can download binary configuration data that can be uploaded or installed on the physical controller. The configuration data can be utilized to configure the physical controller.

In some examples, the method 320 can include altering, by the mixed reality device, a number of functional settings for the physical controller. For example, the mixed reality device can activate and/or deactivate the physical controller. In another example, the mixed reality device can activate and/or deactivate particular features of the physical controller.

In some examples, the method 320 can include switching, in the mixed reality display of the mixed reality device, from the project to a different project. For example, the mixed reality device can display project data for a first project and switch to displaying project data for a second project in response to a query, such as a gesture, a gaze, a voice command, or a combination thereof.

Figure 4:
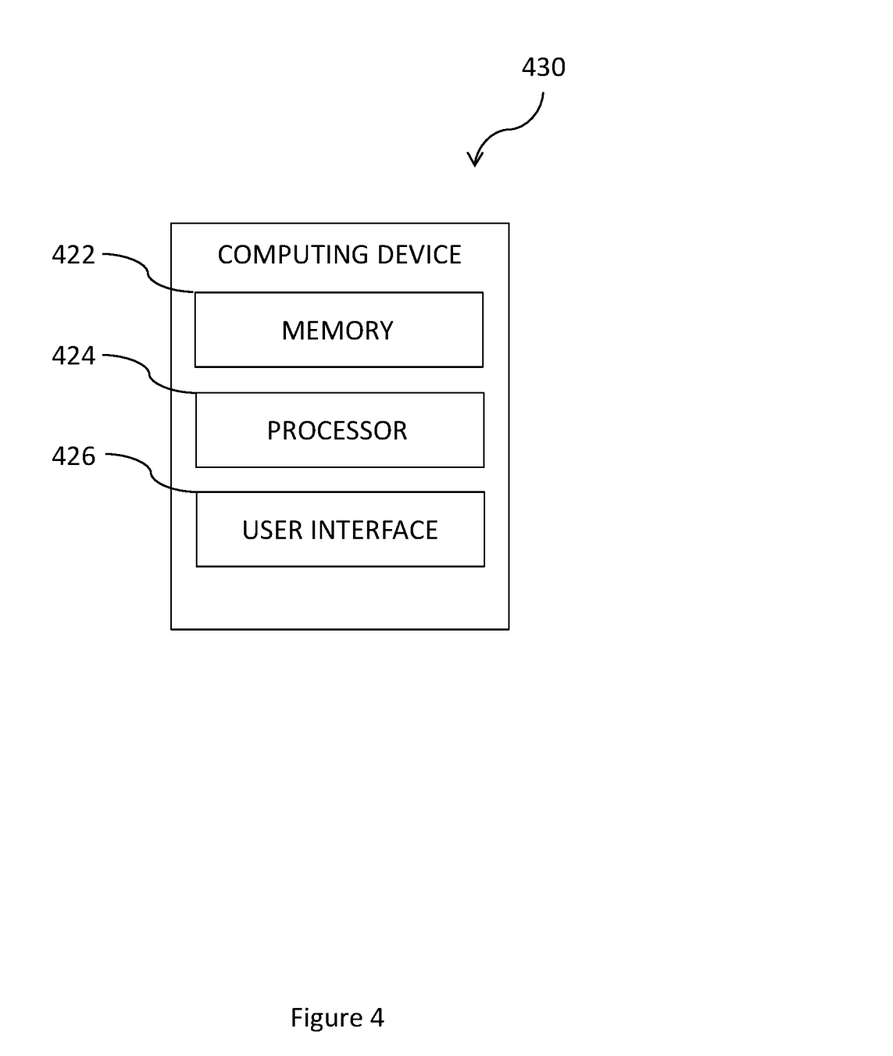
FIG. 4 illustrates an example computing device for building system commissioning using mixed reality, in accordance with one or more embodiments of the present disclosure.

FIG. 4 is an example of a computing device 430 for building system commissioning using mixed reality according to one or more embodiments of the present disclosure. Computing device 430 can be, for example, a commodity server, a data center that comprises a plurality of servers, among other types of computing devices or embedded system. Computing device can be utilized in mixed reality display 100, mixed reality display 210 and/or method 320 to perform the functions previously described herein. For example, computing device 430 can be included in a mixed reality device.

As shown in FIG. 4, computing device 430 includes a memory 422 and a processing resource 424 (e.g., processor) coupled to memory 422. Memory 422 can be any type of storage medium that can be accessed by processing resource 424 to perform various examples of the present disclosure. For example, memory 422 can be a non-transitory computer readable medium having computer readable instructions (e.g., computer program instructions) stored thereon that are executable by processing resource 424 to perform localizing a fault on a live cable in accordance with one or more embodiments of the present disclosure.

Memory 422 can be volatile or nonvolatile memory. Memory 422 can also be removable (e.g., portable) memory, or non-removable (e.g., internal) memory. For example, memory 422 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 422 is illustrated as being located in computing device 430, embodiments of the present disclosure are not so limited. For example, memory 422 can also be located internal to another computing resource (e.g., enabling computer readable instructions to be downloaded over the Internet or another wired or wireless connection).

As shown in FIG. 4, computing device 430 can also include a user interface 426. User interface 426 can include, for example, a mixed reality display (e.g., a screen). The mixed reality display can be, for instance, a touch-screen (e.g., the mixed reality display can include touch-screen capabilities). User interface 426 (e.g., the mixed reality display of user interface 426) can provide (e.g., display and/or present) information to a user of computing device 430.

Additionally, computing device 430 can receive information from the user of computing device 430 through an interaction with the user via user interface 426. For example, computing device 430 (e.g., the mixed reality display of user interface 426) can receive input from the user via user interface 426. The user can enter the input into computing device 430 using, for instance, voice commands, physical gestures, gazing, or by touching the display of user interface 426 in embodiments in which the display includes touch-screen capabilities (e.g., embodiments in which the display is a touch screen).

Figure 5:
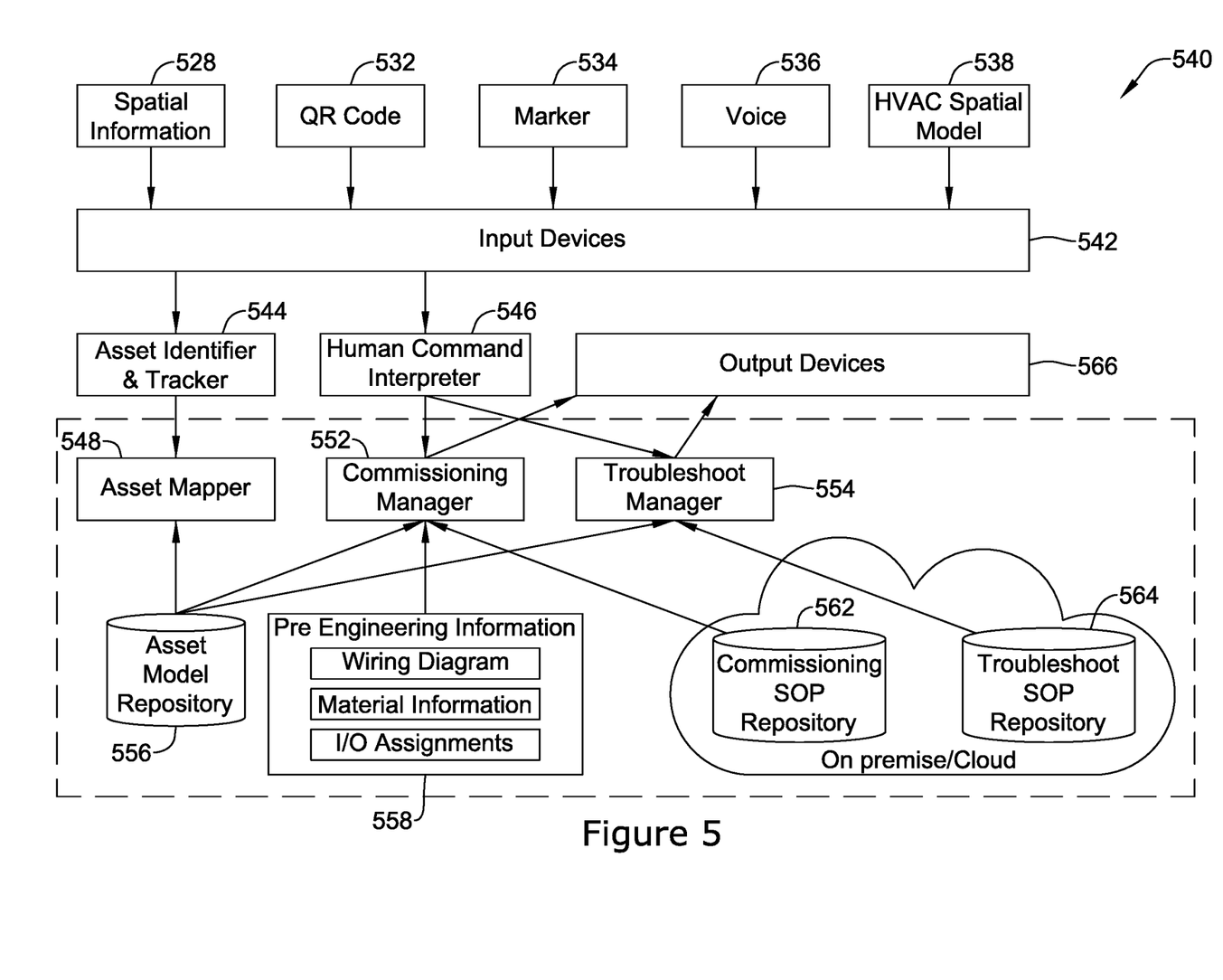
FIG. 5 illustrate an example system for building system commissioning using mixed reality, in accordance with one or more embodiments of the present disclosure.

FIG. 5 illustrate an example system for building system commissioning using mixed reality, in accordance with one or more embodiments of the present disclosure.

As shown in FIG. 5, system 540 can include an input device 542, such as a mixed reality device. As described herein, the mixed reality device can be, for example, a head mounted display, a handheld display, or a spatial display, among other types of mixed realty devices. The mixed reality device can include a computing device, for example, a commodity server, or a data center that comprises a plurality of servers, among other types of mixed reality devices or embedded system.

In some examples, input device 542 can retrieve data (e.g., schematics, configuration data, etc.) relating to a project and/or updating a status of the project, and/or displaying a status of the project. As described herein, input device 542 can receive the data relating to the project from a remote distributed database. Input device 542 can retrieve data relating to the project through spatial information 528, a QR code 532, an augmented reality marker 534, a voice command 536, a HVAC spatial model 538, or a combination thereof.

In some examples input device 542 can retrieve the data relating to the project from the remote distributed database using an asset identifier and tracker 544 and/or a human command interpreter 546. Asset identifier and tracker 544 can interact with input device 542 to receive spatial information or model information for a physical controller.

Additionally, asset identifier and tracker 544 can map the spatial and model information in asset model repository 556. Asset model repository 556 can include information relating to an asset, such as a controller or sensor. Human command interpreter 546 can interpret a command provided by a user, such as a gesture, a gaze, a voice command, or a combination thereof.

The remote distributed database can include asset mapper 548, commissioning manager 552, troubleshooting manager 554, pre-engineering information 558, commissioning standard operating procedure (SOP) repository 562, troubleshoot SOP repository 564, or a combination thereof. Asset mapper 548 can keep track of the equipment and the environment to assist in displaying project information on the mixed reality display. Commissioning manager 552 can coordinate commissioning related activities based on model related information and commissioning SOP. Troubleshooting manager 554 can coordinate troubleshooting related activities based on model related information and troubleshooting SOP. Pre-engineering information 558 can include configuration information, such as wiring information, material information, and I/O assignments. Commissioning SOP repository 562 can include SOP information relating to the process of commissioning of a physical controller. Troubleshoot SOP repository 564 can include SOP information relating to the process of troubleshooting a device.

In some examples, system 540 can include an output device 566, such as a mixed reality device. As described herein, the mixed reality device can include a mixed reality display. The mixed reality display can include project information related to data retrieved from the remote distributed database. Output device 556 can display the mixed reality display which can include an overlay with an object created based on building commissioning data, which may be sensor data, diagnostic procedures, or the like. The overlay may be configured for concurrent display on the mixed reality display of the mixed reality device with a real time image of a physical controller. In one example, the overlay may include project instructions for a project configured for concurrent display with a real time image of the physical controller being commissioned.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for configuring a building system using mixed reality, the computing device comprising computer readable instructions stored thereon that are executable by a processor to:
   retrieve configuration data for a physical controller of the building system from a remote database in response to a request, the configuration data based on an ontology model of the building system and is for configuring the physical controller of the building system to operate in the building system, the physical controller of the building system distinct from the computing device;
   display at least some of the configuration data for the physical controller of the building system in a mixed reality display, wherein the mixed reality display is configured to display an overlay or holographic object of synthetic content on real world content, wherein the synthetic content and real world content react to each other in real time;
   install the retrieved configuration data on the physical controller of the building system in order to configure the physical controller for subsequent use in the building system; and
   wherein the configuration data that is displayed in the mixed reality display and that is installed on the physical controller of the building system includes a number of configuration settings that configure one or more functions of the physical controller upon being installed on the physical controller.

2. The computing device of claim 1, wherein the instructions are executable by the processor to request configuration data upon detecting the physical controller.

3. The computing device of claim 1, wherein the instructions are executable by the processor to display a mesh cache to construct a real world model within a spatial coordinate system.

4. The computing device of claim 1, wherein the configuration data for the physical controller includes:
   installation instructions that instruct a user how to initially install the physical controller; and
   checkout instructions for the physical controller that instruct the user how to test the physical controller once the physical controller has been installed.

5. The mixed reality device of claim 1, wherein the instructions are executable by the processor to request configuration data based on information scanned from the physical controller.

6. The computing device of claim 1, wherein the request is initiated via at least one of a gesture and a gaze.

7. A mixed reality device for commissioning a building system in a building, the mixed reality device comprising computer readable instructions stored thereon that are executable by a processor to:
   download project instructions for a project of installing the building system in the building from a remote database in response to a query, the downloaded project instructions including instructions for installing a physical controller of the building system in the building;
   generate a project checklist based on the project instructions and information detected from the physical controller, the project checklist including a plurality of tasks including a wiring checkout task for verifying the wiring of the physical controller;

display the project instructions and the project checklist for the project in a mixed reality display on the mixed reality device; and receive selectable inputs that indicate completion of each of two or more of the plurality of tasks of the project checklist.

8. The mixed reality device of claim 7, wherein the project checklist includes a task to upload configuration data to the physical controller of the building system.

9. The mixed reality device of claim 7, wherein the project checklist includes one or more of sensor calibration task and a sequence validation task.

10. The mixed reality device of claim 7, wherein the project instructions include a location of the project.

11. A method for building system commissioning using mixed reality, comprising:

receiving, by a mixed reality device, a query for a project for initially commissioning a physical controller in a building, the query comprising at least one of a gesture and a gaze;

downloading, by the mixed reality device, project instructions for the project from a remote database, wherein the project instructions include configuration data for the physical controller for initially configuring the physical controller in the building;

generating, by the mixed reality device, a project checklist for the project based on the project instructions for the project, wherein the project checklist includes a plurality of tasks including a task to upload the configuration data to the physical controller; and displaying, by the mixed reality device, the project instructions and the project checklist for the project in a mixed reality display, wherein the mixed reality display is configured to display an overlay or holographic object of synthetic content on real world content, wherein the synthetic content and real world content react to each other in real time.

12. The method of claim 11, wherein the method includes displaying the mixed reality display in a display of the mixed reality device.

13. The method of claim 11, further comprising receiving inputs, via the mixed reality device, corresponding to the project checklist upon completion of tasks associated with the project.

14. The method of claim 11, further comprising calibrating the physical controller by uploading the configuration data to the physical controller.

15. The method of claim 11, wherein the method includes updating the project checklist by inputting, via the mixed reality display, test results for the project.

16. The method of claim 11, further comprising displaying, in the mixed reality display of the mixed reality device, an overview of progress for the project.

17. The method of claim 11, further comprising switching, in the mixed reality display of the mixed reality device, from the project to a different project.

18. The method of claim 11, further comprising altering, via the mixed reality device, a number of functional settings for the physical controller.

* * * * *